United States Patent
Mortreux

(10) Patent No.: US 10,302,188 B2
(45) Date of Patent: May 28, 2019

(54) PULLING DEVICE FOR A VEHICLE, IN PARTICULAR FOR A RAILWAY VEHICLE, HAVING AN IMPROVED SECURITY

(71) Applicant: Alstom Transport Technologies, Saint-Ouen (FR)

(72) Inventor: Francis Mortreux, Maisons-Laffitte (FR)

(73) Assignee: Alstom-Transport Technologies, Saint-Ouen (FR)

( * ) Notice: Subject to any disclaimer, the term of this patent is extended or adjusted under 35 U.S.C. 154(b) by 174 days.

(21) Appl. No.: 15/622,562

(22) Filed: Jun. 14, 2017

(65) Prior Publication Data

US 2017/0363199 A1  Dec. 21, 2017

(30) Foreign Application Priority Data

Jun. 15, 2016  (FR) ...................... 16 55563

(51) Int. Cl.
| | |
|---|---|
| *F16H 57/10* | (2006.01) |
| *B61C 11/00* | (2006.01) |
| *B61K 9/00* | (2006.01) |
| *B61L 23/34* | (2006.01) |
| *F16H 1/28* | (2006.01) |
| *B61C 9/38* | (2006.01) |
| *B61C 9/50* | (2006.01) |

(52) U.S. Cl.
CPC .............. *F16H 57/10* (2013.01); *B61C 9/38* (2013.01); *B61C 9/50* (2013.01); *B61C 11/00* (2013.01); *B61K 9/00* (2013.01); *B61L 23/34* (2013.01); *F16H 1/28* (2013.01); *Y02T 30/10* (2013.01)

(58) Field of Classification Search
None
See application file for complete search history.

(56) References Cited

U.S. PATENT DOCUMENTS

| | | |
|---|---|---|
| 2011/0316460 A1 | 12/2011 | Yasuoka et al. |
| 2013/0328512 A1 | 12/2013 | Ozaki |
| 2014/0024490 A1 | 1/2014 | Bangura et al. |
| 2015/0135863 A1 | 5/2015 | Dalum |

FOREIGN PATENT DOCUMENTS

| | | |
|---|---|---|
| DE | 102014201237 A1 | 7/2015 |
| EP | 0025484 A1 | 3/1981 |
| JP | 2009-220711 A | 10/2009 |

OTHER PUBLICATIONS

Preliminary Search Report dated Mar. 2, 2017 during the prosecution of FR 1655563.

*Primary Examiner* — Timothy Hannon
(74) *Attorney, Agent, or Firm* — Troutman Sanders LLP

(57) ABSTRACT

The pulling device includes at least one motor; an epicyclic (or planetary) gear train comprising a first element, a second element, and a third element selected from an internal sun gear, an external ring gear, and a planet carrier, the first element being integrally secured in rotation with the output shaft of the motor, the second element being designed to drive an axle of the vehicle in rotation; the detection means detecting an anomaly with respect to the motor; the releasable locking means, that are capable of assuming a locking configuration locking the third element in rotation, and a release configuration for releasing the third element; and the control means command—controlling the maintaining of the locking means in the locking configuration when no anomaly is detected, and moving of the locking means into the release configuration when an anomaly is detected.

9 Claims, 1 Drawing Sheet

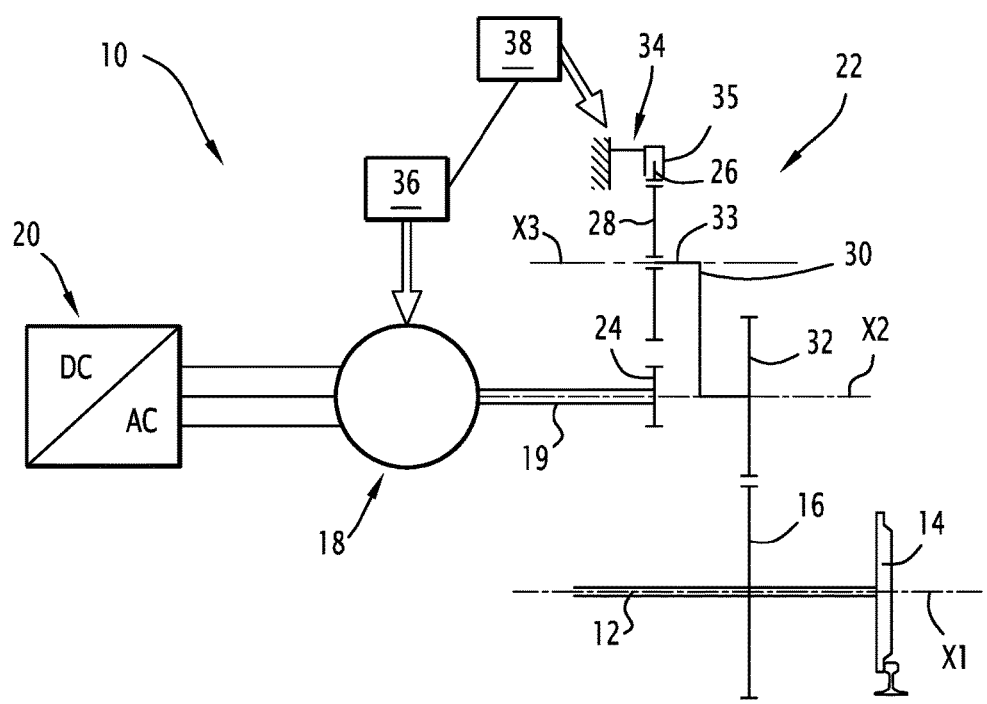

PULLING DEVICE FOR A VEHICLE, IN PARTICULAR FOR A RAILWAY VEHICLE, HAVING AN IMPROVED SECURITY

CROSS-REFERENCE TO RELATED APPLICATION

This application is based upon and claims the benefit of priority of the prior French Patent Application No. 1655563, filed on Jun. 15, 2016, the entire contents of which are incorporated herein by reference.

FIELD OF THE INVENTION

The present invention relates to a pulling device for pulling a vehicle, in particular a railway vehicle.

BACKGROUND

A technology already known in the state of the art, features a pulling device that includes at least one motor comprising an output shaft. The output shaft is designed for driving an axle of the vehicle, generally by means of a gearbox.

In certain cases, the motor may encounter anomalies that could negatively affect its operation, or even be detrimental to its integrity. For example, in the case of a synchronous motor, short circuits may occur at the level of the stator, thus generating a high level of heat emission and thereby raising the temperature locally. Such a temperature increase can damage the motor, and thus necessitates the presence of fire safety equipment in close proximity.

The invention is thus aimed in particular at improving the situation by providing a pulling device which offers an improved level of safety and security.

SUMMARY

To this end, the invention in particular relates to a pulling device for pulling a vehicle, in particular for a railway vehicle, that includes at least one motor comprising an output shaft, characterised in that it includes:
  an epicyclic (or planetary) gear train, comprising a first element, a second element, and a third element, selected from an internal sun gear, an external ring gear, and a planet carrier carrying the planet gears that engage by intermeshing with the internal sun gear and with the external ring gear, the first element being integrally secured in rotation with the output shaft, the second element being designed to drive an axle of the vehicle in rotation;
  the detection means for detecting an anomaly with respect to the motor;
  the releasable locking means, that are capable of assuming a locking configuration in which they immobilise the third element in rotation, and a release configuration in which the third element is released so as to be freely rotatable;
  the control means for controlling the locking means, that are capable of maintaining the locking means in the locking configuration when the detection means do not detect any anomalies, and of moving the locking means into the release configuration when the detection means detect an anomaly.

In case of an anomaly being detected, the third element is released so as to be freely rotatable, such that the rotation of the axle drives the rotation of this third element rather than that of the shaft of the motor. Thus, the motor can be stopped without residual rotation due to the axle, so as to be able to put an end to the anomaly detected.

A pulling device according to the invention may in addition include one or more of the following characteristic features.

The motor is of the synchronous type.
  The anomaly detecting means are capable of detecting a short circuit, in the motor or in an electric power supply circuit of the motor.
  The locking means comprise at least one brake that is capable of clamping the third element into the locking configuration and of releasing the third element into the release configuration.
  The third element is formed by the external ring gear and includes a ring comprising an internal toothed surface that engages by intermeshing with the planet gears, the locking means comprising at least one brake that is capable of clamping the ring into the locking configuration and of releasing the ring into the release configuration.
  The second element is formed by the planet carrier and includes a toothed circular portion designed to engage by intermeshing with a complementary toothed wheel carried by the axle.
  The pulling device includes an inverter that supplies power to the motor.

The invention also relates to a railway vehicle, that includes at least one bogie provided with at least one axle, characterised in that it includes at least one pulling device as previously defined above, in which the epicyclic (or planetary) gear train is kinematically connected to the said axle.

The invention finally relates to a protection method for protecting a pulling device as previously defined above, characterised in that:
  the detection means continuously monitor the motor so as to detect the presence of an anomaly therein; and
  when an anomaly is detected, the control means move the locking means into the release configuration.

BRIEF DESCRIPTION OF THE DRAWINGS

The invention will be better understood upon reading the description which will follow, provided solely by way of example and with reference being made to the single appended FIGURE that schematically represents a pulling device according to an exemplary embodiment of the invention.

FIG. 1 is a schematic of a pulling device according to an example of the invention.

DETAILED DESCRIPTION

Represented in the FIGURE is a pulling device 10 intended to be fitted in a vehicle, in particular a railway vehicle.

The vehicle includes at least one axle 12 carrying two wheels 14. In the case of a railway vehicle, the latter usually includes at least one bogie, that comprises at least the said axle 12. The axle 12 is movable in rotation around a first axis X1.

The axle 12 is integrally secured in rotation with a toothed wheel 16 by means of which the said axle 12 is kinematically connected to the pulling device 10.

The pulling device 10 includes a motor 18.

Advantageously, the motor 18 is a synchronous motor. Such a synchronous motor is more efficient and presents greater compactness than an asynchronous motor.

The motor 18 includes in a conventional manner, a stator and a rotor, the rotor being integrally secured in rotation with an output shaft 19. This output shaft 19 is movable in rotation about a second axis X2.

The synchronous motor 18 is supplied with power in a conventional manner by power supply means, comprising in particular an inverter 20.

The pulling device 10 includes an epicyclic gear train set 22, arranged between the output shaft 19 and the axle 12.

The epicyclic gear train 22 comprises a first element, a second element, and a third element, selected from an internal sun gear 24, an external ring gear 26, and a planet carrier 30 carrying the planet gears 28 that engage by intermeshing with the internal sun gear 24 and with the external ring gear 26, the first element being integrally secured in rotation with the output shaft 19, the second element being designed to drive an axle 12 of the vehicle in rotation.

In the example described, the first element is formed by the internal sun gear 24, which is thus then integrally secured in rotation with the output shaft 19, and therefore movable in rotation about the second axis X2.

In the example described, the third element is formed by the external ring gear 26. The external ring gear 26 presents a generally circular-shaped form rotating about the second axis X2. The external ring gear 26 has for example a ring-shaped form, comprising a toothed internal surface.

The epicyclic gear train 22 also includes at least one planet gear 28, generally three planet gears 28, each engaging by intermeshing with the internal sun gear 24 and with the external ring gear 26 (in particular with the toothed internal surface). Thus, each planet gear 28 is disposed radially between the internal sun gear 24 and the external ring gear 26. Each planet gear 28 presents a generally circular-shaped form rotating about a respective third axis X3, and each planet gear 28 is movable in rotation about this respective third axis X3.

In accordance with the example described, the second element is formed by the planet carrier 30. The planet carrier 30 includes a toothed circular portion 32, that is movable in rotation around the second axis X2, and is complementary to the toothed wheel 16 and that engages by intermeshing with this toothed wheel 16. The planet carrier 30 also comprises, for each planet gear 28, a supporting portion 33 that is connected in a pivotable manner to this planet gear 28, this pivotable connection being defined about the corresponding third axis X3.

The pulling device 10 includes the locking means 34 for locking the third element, that is to say the external ring gear 26 in the example described. Thus, when the external ring gear 26 is locked in rotation, the rotation of the output shaft 19 about the second axis X2, thus of the internal sun gear 24 about the second axis X2, drives the planet gears 28 in rotation about their respective third axis X3.

Since the planet gears 28 engage by intermeshing with the locked external ring gear 26, these planet gears 28 move along the internal surface thereof, thus driving the planet carrier 30 in rotation about the second axis X2.

This planet gear carrier 30 thus then drives the axle 12 in rotation about the first axis X1, by means of the toothed circular portion 32 engaging by intermeshing with the gear wheel 16.

The blocking means 34 are releasable, such that they are able to assume a locking configuration in which the external ring gear 26 is immobilised in rotation, as described here above, and a release configuration in which the external ring gear 26 is released so as to be freely rotatable about the axis X2.

The locking means 34 for example comprise at least one brake 35 that is capable of clamping the ring 26 into the locking configuration and of releasing the ring 26 into the release configuration.

When the external ring gear 26 is free to rotate, and the axle 12 is in rotation about the first axis X1, this axle 12 drives the planet carrier 30 in rotation about the second axis X2 by means of the toothed wheel 16 engaging by intermeshing with the toothed circular portion 32.

As a result of the effect of the rotation of the planet carrier 30 about the second axis X2, the planet gears 28 move around the said second axis X2, while undergoing rotation about their respective third axis X3. Each planet gear 28 engages by intermeshing with the external ring gear 26, which is free to rotate, and the internal sun gear 24 which is integrally secured with the output shaft 19. The resistance to rotation of the internal sun gear 24 is thus much higher than that of the external ring gear 26. Thus, 28 the rotation of the planet gears about their respective third axis X3 is transmitted to the external ring gear 26 rather than to the internal sun gear 24. As a result thereof, the motor 18 can be stopped without interference with the rotation of the axle 12.

Such a stoppage of the motor 18 is desirable in case of operational anomalies with respect to the motor, in particular in the event of short circuit in the motor or in an electric power supply circuit of the motor.

Thus, the pulling device 10 includes the detection means 36 for detecting an anomalies with respect to the motor 18. In the present description, the term "anomaly" is used to refer to any malfunction of the motor that could adversely affect its proper operation and/or its integrity.

The detection means 36 comprise for example, conventional short circuit detection means for detecting a short circuit, and/or temperature measuring means that provide the ability to detect a rise in temperature beyond a predetermined threshold value. Thus, an anomaly is for example considered to have been detected when a short circuit is detected or when the temperature exceeds the predetermined threshold level.

The pulling device 10 further includes the control means 38 for controlling the locking means 34, that are capable of command-controlling the maintenance of the locking means 34 in the locking configuration or the moving of the locking means 34 into the release configuration.

The control means 38 are connected to the detection means 36, such that the controlling of the locking means 34 is determined and conditioned by the detection of anomalies.

More particularly, the control means 38 are configured in order to maintain the locking means 34 in the locking configuration when the detection means 36 do not detect any anomalies, and to move the locking means 34 into the release configuration when the detection means 36 detect an anomaly.

Thus, when an anomaly is detected, the external ring gear 26 is released so as to be freely rotatable, such that the rotation of the shaft 19 no longer interferes with the rotation of the axle 12, as previously described. The motor 18 can be stopped in order to remedy the anomaly.

In other words, the pulling device 10 makes it possible to implement a motor protection method for protecting the motor 18, in which:

the detection means 36 continuously monitor the motor 18 so as to detect the presence of an anomaly therein; and when an anomaly is detected, the control means 38 move the locking means 34 into the release configuration.

During the course of the protection method for protecting the motor 18, the locking means 34 are maintained in the locking configuration as long as no anomaly is detected.

It should be noted that the invention is not limited to the embodiments previously described above, and may have various additional variant embodiments.

In particular, it is possible to provide for other detection means for detection of anomalies that determine the conditions of release of the locking means 34 as well as other configurations of the epicyclic gear train 22.

Thus, by way of a variant, the second element is formed by the internal sun gear, which is thus then designed for driving the axle in rotation, while the first element is formed by the external ring gear, which is then integrally secured in rotation with the output shaft. In this case, the third element is formed by the planet carrier, which is thus associated with the releasable locking means.

I claim:

1. A pulling device for pulling a vehicle, that includes at least one motor comprising an output shaft, comprising:
    an epicyclic gear train, comprising a first element, a second element, and a third element all selected from an internal sun gear, an external ring gear, and a planet carrier carrying planet gears that engage by intermeshing with the internal sun gear and with the external ring gear, the first element being integrally secured in rotation with the output shaft, the second element being designed to drive an axle of the vehicle in rotation;
    an anomaly detector detecting an anomaly with respect to the motor;
    a releasable locker, that is capable of assuming a locking configuration in which it immobilises the third element in rotation, and a release configuration in which the third element is released so as to be freely rotatable; and
    a controller controlling the releasable locker, that is capable of maintaining the releasable locker in the locking configuration when the anomaly detector does not detect the anomaly, and of moving the releasable locker into the release configuration when the anomaly detector detects the anomaly.

2. The pulling device according to claim 1, in which the motor is a synchronous motor.

3. The pulling device according to claim 1, in which the anomaly is a short circuit, in the motor or in an electric power supply circuit of the motor.

4. The pulling device according to claim 1, in which the releasable locker comprises at least one brake that is configured to clamp the third element into the locking configuration and release the third element into the release configuration.

5. The pulling device according to claim 1, in which the third element is formed by the external ring gear and includes a ring comprising an internal toothed surface that engages by intermeshing with the planet gears, the releasable locker comprising at least one brake that is configured to clamp the ring into the locking configuration and release the ring into the release configuration.

6. The pulling device according to claim 1, in which the second element is formed by the planet carrier and includes a toothed circular portion designed to engage by intermeshing with a complementary gear carried by the axle.

7. The pulling device according to claim 1, further comprising an inverter that supplies power to the motor.

8. A railway vehicle that includes at least one bogie provided with at least one axle, wherein in that it includes at least one pulling device that includes at least one motor comprising an output shaft, the pulling device comprising:
    an epicyclic gear train, comprising a first element, a second element, and a third element all selected from an internal sun gear, an external ring gear, and a planet carrier carrying planet gears that engage by intermeshing with the internal sun gear and with the external ring gear, the first element being integrally secured in rotation with the output shaft, the second element being designed to drive the at least one axle of the vehicle in rotation;
    an anomaly detector detecting an anomaly with respect to the motor;
    a releasable locker, that is capable of assuming a locking configuration in which it immobilises the third element in rotation, and a release configuration in which the third element is released so as to be freely rotatable; and
    a controller controlling the releasable locker that is capable of maintaining the releasable locker in the locking configuration when the anomaly detector does not detect the anomaly, and of moving the releasable locker into the release configuration when the anomaly detector detects the anomaly, and in which the epicyclic gear train is kinematically connected to the said axle.

9. A protection method for protecting a pulling device that includes at least one motor comprising an output shaft, the pulling device comprising:
    an epicyclic gear train, comprising a first element, a second element, and a third element all selected from an internal sun gear, an external ring gear, and a planet carrier carrying planet gears that engage by intermeshing with the internal sun gear and with the external ring gear, the first element being integrally secured in rotation with the output shaft, the second element being designed to drive an axle of the vehicle in rotation;
    an anomaly detector detecting an anomaly with respect to the motor;
    a releasable locker, that is capable of assuming a locking configuration in which it immobilises the third element in rotation, and a release configuration in which the third element is released so as to be freely rotatable; and
    a controller controlling the releasable locker, that is capable of maintaining the releasable locker in the locking configuration when the anomaly detector does not detect the anomaly, and of moving the releasable locker into the release configuration when the anomaly detector detects the anomaly,
    wherein the anomaly detector continuously monitors the motor so as to detect the presence of an anomaly therein; and
    wherein when an anomaly is detected, the controller moves the releasable locker into the release configuration.

* * * * *